United States Patent
Horiuchi et al.

(10) Patent No.: US 7,635,081 B2
(45) Date of Patent: Dec. 22, 2009

(54) APPARATUS AND METHOD FOR PORTABLE INFORMATION TERMINAL

(75) Inventors: Mitsuo Horiuchi, Sagamihara (JP); Fusanobu Nakamura, Yamato (JP)

(73) Assignee: Lenovo Singapore Pte. Ltd., Singapore (SG)

( * ) Notice: Subject to any disclaimer, the term of this patent is extended or adjusted under 35 U.S.C. 154(b) by 861 days.

(21) Appl. No.: 09/961,722

(22) Filed: Sep. 24, 2001

(65) Prior Publication Data
US 2002/0048148 A1   Apr. 25, 2002

(30) Foreign Application Priority Data
Oct. 25, 2000   (JP) .............................. 2000-325262

(51) Int. Cl.
G06F 15/02   (2006.01)
G06M 1/02   (2006.01)
H01H 13/702   (2006.01)

(52) U.S. Cl. ..................................... 235/1 D
(58) Field of Classification Search ................. 235/1 D; 361/683, 686, 680; 312/223.1–223.3
See application file for complete search history.

(56) References Cited

U.S. PATENT DOCUMENTS

| | | | | |
|---|---|---|---|---|
| 4,560,844 A | * | 12/1985 | Takamura et al. | 200/5 A |
| 4,841,412 A | * | 6/1989 | Heys et al. | 361/680 |
| 5,107,400 A | * | 4/1992 | Kobayashi | 361/685 |
| 5,443,320 A | * | 8/1995 | Agata et al. | 400/715 |
| 5,490,037 A | * | 2/1996 | Clancy | 361/680 |
| 5,544,011 A | * | 8/1996 | Blaney et al. | 361/683 |
| 5,764,476 A | * | 6/1998 | Ohgami et al. | 361/683 |
| 5,767,999 A | * | 6/1998 | Kayner | 359/163 |
| 5,796,579 A | * | 8/1998 | Nakajima et al. | 361/683 |
| 5,915,655 A | * | 6/1999 | Gutowski | 248/118.5 |
| 6,164,368 A | * | 12/2000 | Furukawa et al. | 165/104.33 |
| 6,262,883 B1 | * | 7/2001 | Kim | 361/680 |
| 6,694,594 B2 | * | 2/2004 | Chung et al. | 29/469.5 |

* cited by examiner

*Primary Examiner*—Kumiko C Koyama
(74) *Attorney, Agent, or Firm*—Ronald V. Davidg

(57) ABSTRACT

A portable information terminal includes a housing reinforced to maintain its strength while the while the portable information terminal is reduced in weight and thickness.

4 Claims, 5 Drawing Sheets

APPARATUS AND METHOD FOR PORTABLE INFORMATION TERMINAL

BACKGROUND OF THE INVENTION

1. Field of the Invention

The present invention relates to a housing of a portable information terminal such as a notebook PC, a PDA or a game machine and more particularly to a reinforcing of the structure of the portable information terminal. The present invention also relates to a method of reinforcing the housing and to a portable information terminal using the housing.

2. Background of the Related Art

In recent years, with the increasing need to reduce the weight and thickness of portable information terminals, such as notebook PCs, PDAs, and game machines, the strength of housings of portable information terminals has become critical. In other words, based upon market demands, it has become necessary to minimize the thickness of a housing of a portable information terminal in order to reduce the weight and thickness of the portable information terminal. However, a reduction in the thickness of a housing of a portable information terminal, may often result in failure to provide the structural strength required for the portable information terminal.

For instance, FIG. 6 shows the construction of an ordinary notebook PC as an example of a portable information terminal. In the example shown in FIG. 6, the notebook PC 51 is constructed by attaching a keyboard unit 53 and an LCD panel 54 to a housing 52 made of, for example, electrically conductive CFRP. Attempts have been made to reduce the thickness of the housing 52 in the thus-constructed notebook PC 51 to such a limit as to satisfy the recent weight/thickness reduction requirements. In actual use, however, particularly when a user holds between his or her fingers one or both of two front corners A and B closer to the user as shown in FIG. 6 while the LCD panel 54 is set in the operating state, an excessively large force is applied to the housing 52 through leverage by the weight of the main body of the notebook PC 51 and the weight of the LCD panel 54 with the center of gravity shifted rearward. A design for reducing the weight and thickness of the notebook PC 51 is restricted because of this problem.

Also in the notebook PC 51, a metallic base plate constituting the keyboard unit 53 is maintained at ground level to enable the keyboard unit 53 to function as a shielding plate for shielding against external noise and electric wave noise emitted from the PC itself. However, as the notebook PC is further reduced in weight and thickness, the space in the housing 52 becomes so small that it is difficult to maintain the keyboard unit 53 at ground level. Thus, there is a problem that the keyboard unit 53 is not sure to perform the function of a shielding plate for shielding against external noise and electric wave noise emitted from the PC itself.

SUMMARY OF THE INVENTION

Figure 1:
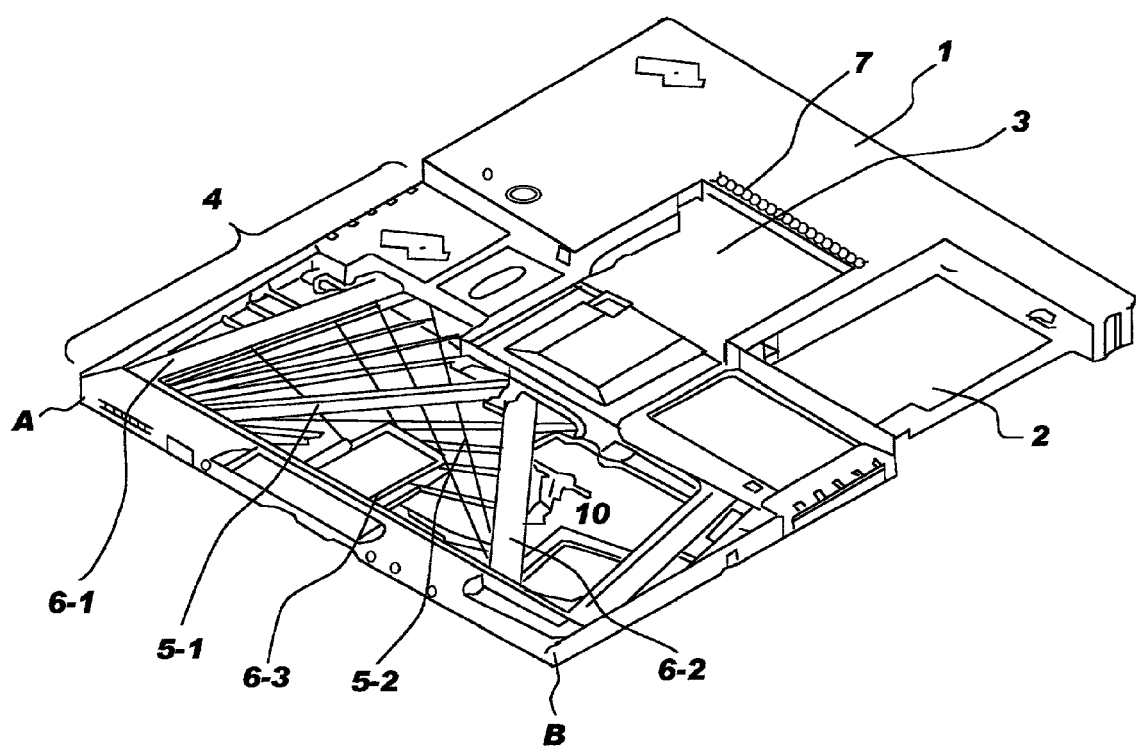
FIG. 1 illustrates a method of reinforcing a housing of a portable information terminal in a preferred embodiment of the present invention.

A first object of the present invention is to provide a housing of a portable information terminal free from the above-described problems that is capable of maintaining its strength while the portable information terminal is reduced in weight and thickness, a method of reinforcing the housing, and a portable information terminal using the housing.

A second object of the present invention is to provide a housing of a portable information terminal free from the above-described problems and capable of reliably grounding the keyboard unit and the housing while the portable information terminal is reduced in weight and thickness, a method of reinforcing the housing, and a portable information terminal using the housing.

The present invention provides, in a first aspect, a housing of a portable information terminal comprising a body having a polygonal outer shape, and a plurality of reinforcing ribs arranged radially from a corner of the body closer to a front side of the body facing a user in practical use. The present invention provides in a second aspect a housing of a portable information terminal comprising a body having a polygonal outer shape, and a plurality of reinforcing members arranged radially from a corner of the body closer to a front side of the body facing a user in practical use. The present invention provides in a third aspect a housing of a portable information terminal comprising a body having a polygonal outer shape, and a plurality of reinforcing ribs and a plurality of reinforcing members, the reinforcing ribs and reinforcing members being arranged radially from a corner portion of the body closer to a front side of the body facing a user in practical use.

The present invention also provides a method of reinforcing a housing of a portable information terminal having a body having a polygonal outer shape, the method comprising arranging a plurality of reinforcing ribs and/or a plurality of reinforcing members radially from a corner portion of the body of the housing closer to a front side of the body facing a user in practical use. Further, the present invention provides a housing of a portable information terminal comprising a body having a polygonal outer shape, and a plurality of reinforcing ribs and/or a plurality of reinforcing members arranged radially from a corner portion of the body closer to a front side of the body facing a user in practical use.

According to the present invention, reinforcing ribs and/or reinforcing members are formed radially from a corner closer to a user in practical use to make the housing strong enough to resist even against a force applied through leverage when a user holds the corner between his or her fingers.

In a preferred embodiment of the present invention in the second or third aspect of the present invention, an EMI contact finger is provided inside at least one of the reinforcing members and it is preferable to arrange the housing so that a keyboard unit is mounted on a portion of the housing on which the reinforcing members are arranged, and so that a base plate of the keyboard unit and the EMI contact finger are brought into contact with each other when the keyboard unit is attached to the housing. Advantageously, in this case, the base plate of the keyboard and the EMI contact finger can be brought into contact with each other at a plurality of points, thereby enabling the base plate of the keyboard unit to be maintained at ground level with reliability.

DETAILED DESCRIPTION

Figure 6:
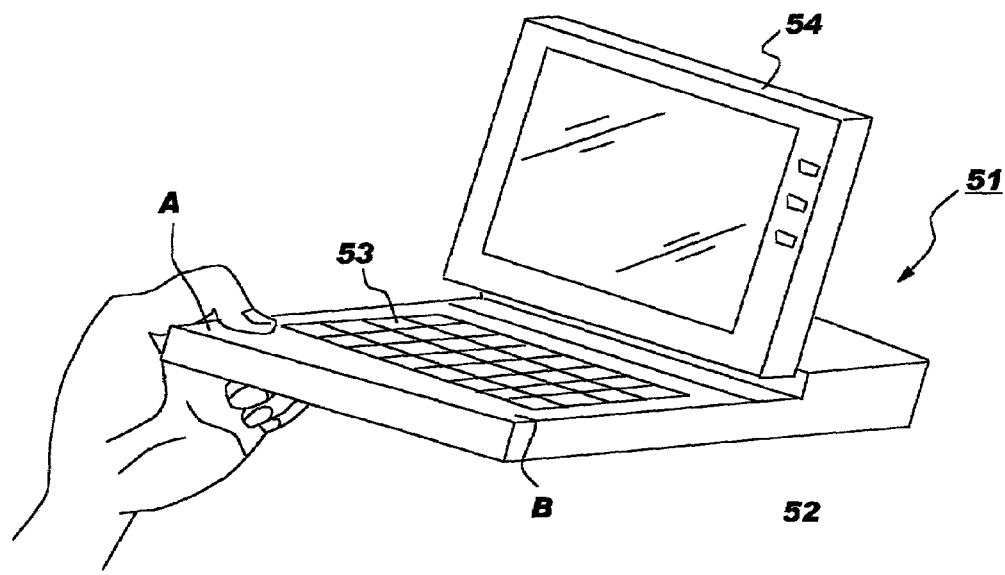
FIG. 6 shows an exemplar construction of an ordinary notebook PC.

FIG. 1 illustrates a method of reinforcing a housing of a notebook PC, which is an example of a portable information terminal in accordance with the present invention. A housing 1 shown in FIG. 1 is used in a notebook PC 51 shown in FIG. 6. Referring to FIG. 1, the housing 1 made of, for example, CFRP has a battery bay 2, an LCD attachment portion 3, and a keyboard unit attachment portion 4. An LCD panel not shown is attached to a hinge 7 provided in the LCD attachment portion 3. The LCD panel can be accommodated in a recess formed by the LCD panel attachment portion 3 and the keyboard unit attachment portion 4. The housing 1 additionally includes a web portion 10 extending between opposite edges of the housing.

A feature of the present invention resides in the fact that, in the keyboard unit attachment portion 4 of the housing 1, reinforcing ribs 5-1 and 5-2 are formed integrally with the housing 1 so as to extend radially from two corners A and B remote from the position at which the LCD panel unit is attached (LCD panel attachment portion 3), and closer to the front side of the housing 1 facing a user in practical use. In this example, a plurality of reinforcing ribs 5-1 are formed so as to extend radially from the corner A while a plurality of reinforcing ribs 5-2 are formed so as to extend radially from the corner B. The pluralities of reinforcing ribs 5-1 and 5-2 each extend to reinforce the web portion 10 at a plurality of an acute angles from the edge of the housing extending between corners A and B. However, these reinforcing ribs 5-1 and 5-2 are not provided in a region required to accommodate a circuit board, etc., in the space formed between the housing 1 and the keyboard unit (not shown) placed on the housing 1. In this example, reinforcing member accommodation portions 6-1, 6-2, and 6-3 for accommodating reinforcing members to be described later are also formed so as to extend radially from the corners A and B.

Figure 2:
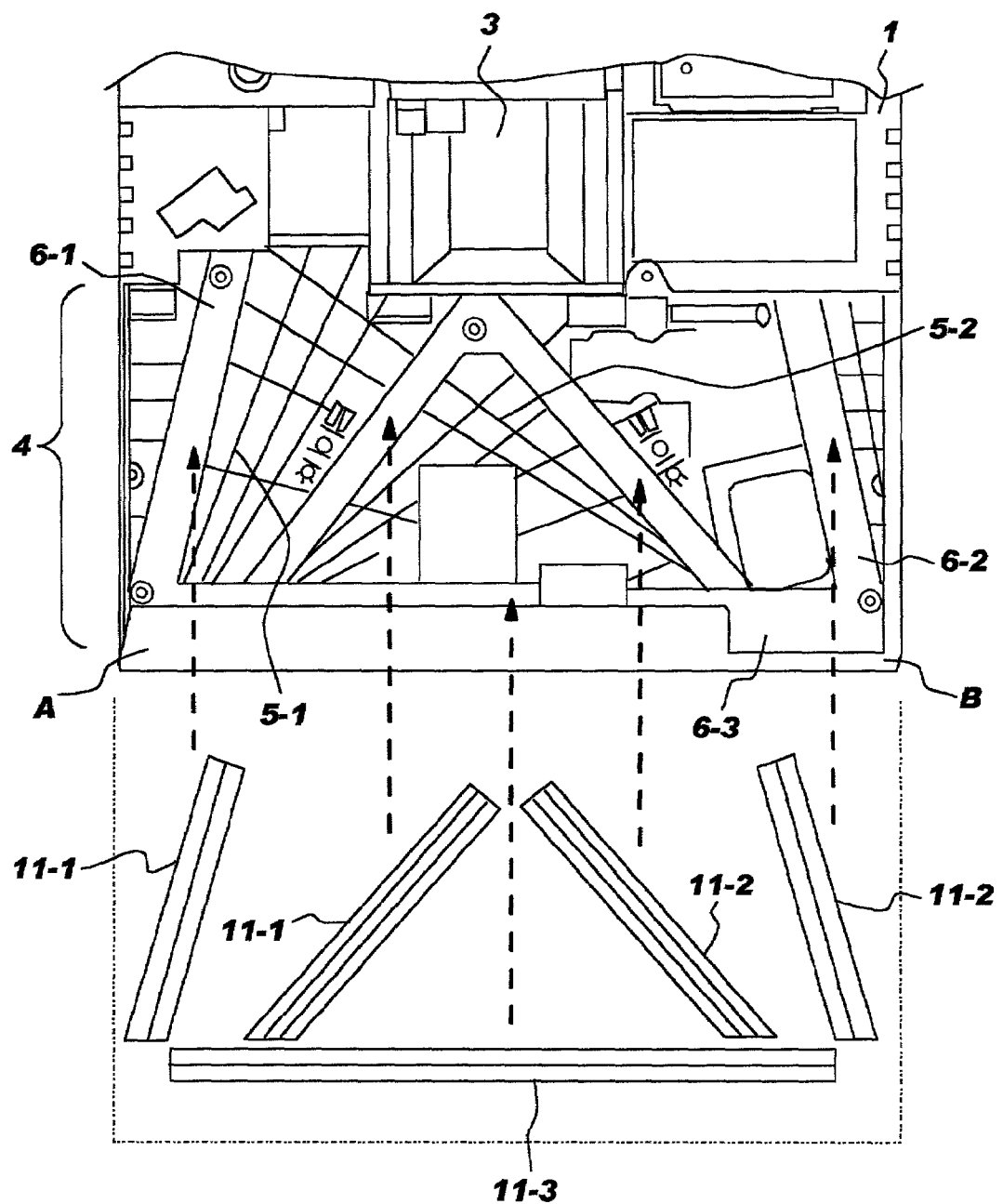
FIG. 2 illustrates reinforcing members in the method of reinforcing the housing of the portable information terminal of the present invention.

FIG. 2 illustrates reinforcing members in the method of reinforcing the housing of the notebook PC in accordance with the present invention. In FIG. 2, members or portions corresponding to those shown in FIG. 1 are indicated by the same reference characters, and the description for them will not be repeated. Referring to FIG. 2, reinforcing members 11-1 are provided so as to extend radially from the corner portion A in correspondence with the reinforcing member accommodation portions 6-1 provided in the housing 1, and reinforcing members 11-2 are provided so as to extend radially from the corner B in correspondence with the reinforcing member accommodation portions 6-2. A reinforcing member 11-3 is provided along a line connecting the portion A and the corner portion B in correspondence with the reinforcing member accommodation portion 6-3 provided in the housing 1. Each of the reinforcing members 11-1, 11-2, and 11-3 has a generally U-shaped cross section to increase the strength. The two reinforcing members 11-1 support the web portion 10 (shown in FIG. 1) at two different acute angles from the edge extending between the corner portion A and the corner portion B.

The reinforcing ribs 5-1 and 5-2 are provided as shown in FIG. 1, or the reinforcing ribs 5-1 and 5-2 and the reinforcing members 11-1, 11-2, and 11-3 are provided as shown in FIG. 2 to achieve reinforcement of the housing 1, particularly reinforcement in radial directions from the corner portions A and B, so that deformation or breakage of the housing 1 during handling by a user can be prevented even if the thickness of the housing 1 is minimized. It will be further understood that various changes in the details, materials, and arrangements of the parts which are described and illustrated in order to explain the nature of this invention may be made by those skilled in the art without departing from the principle and scope of the present invention, such that the invention can be achieved by providing a structure different from that shown in FIGS. 1 and 2, such as one having only reinforcing members 11-1, 11-2, and 11-3 and no reinforcing ribs 5-1 and 5-2.

Figure 3:
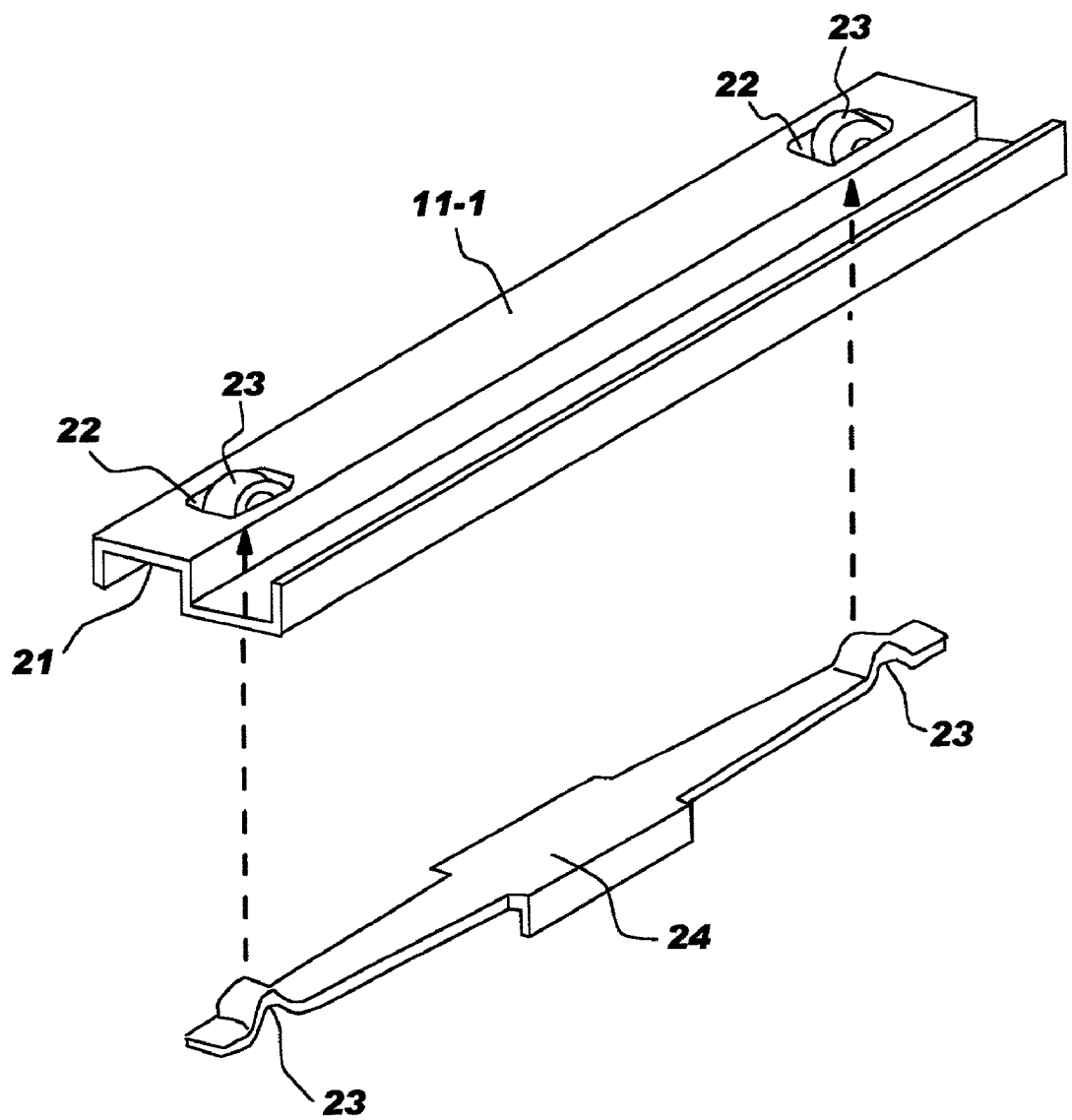
FIG. 3 shows an exemplar reinforcing member used in a preferred embodiment of the present invention.

FIG. 3 shows an exemplar reinforcing member used in accordance with the present invention. In this example, a reinforcing member 11-1 is formed so as to accommodate an EMI contact finger 24 in its channel portion of 21 having a generally U-shaped cross section, as described below. Openings 22 are formed in two places in the surface of the channel portion 21 facing the base plate of the keyboard unit when the keyboard unit is attached. The EMI contact finger 24 has raised portions 23 at positions corresponding to the openings 22. The raised portions 23 project through the openings 22 when the EMI contact finger 24 is accommodated in the channel portion 21. Similarly, other reinforcing members 11-2 and 11-3 may be formed in the same manner.

Figure 4A:
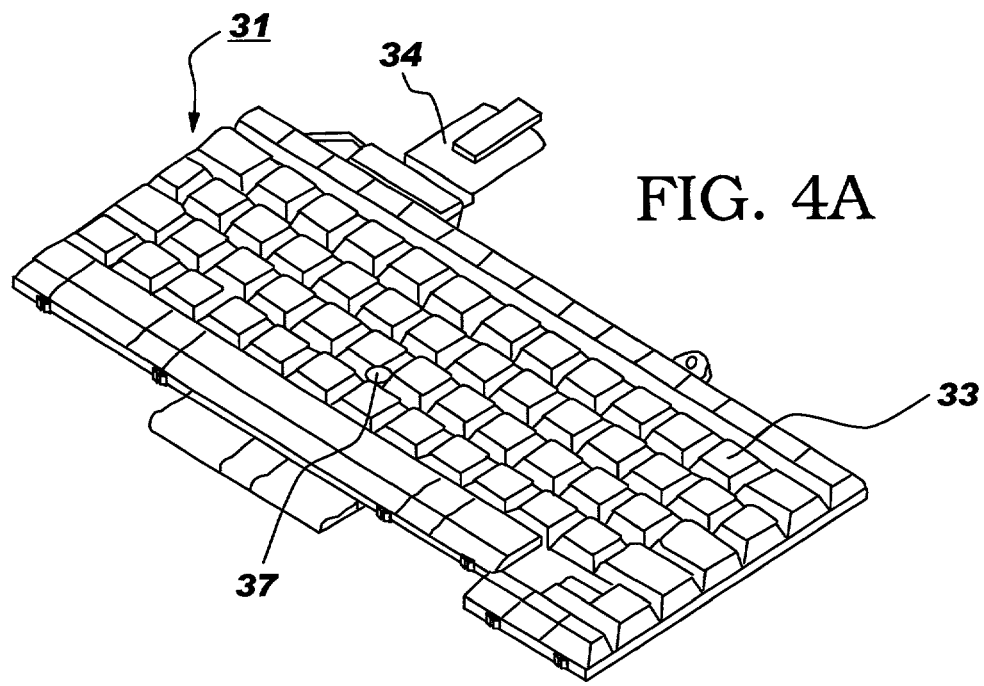
FIGS. 4A and 4B illustrate an exemplar keyboard unit used in a preferred embodiment of the present invention.
Figure 4B:
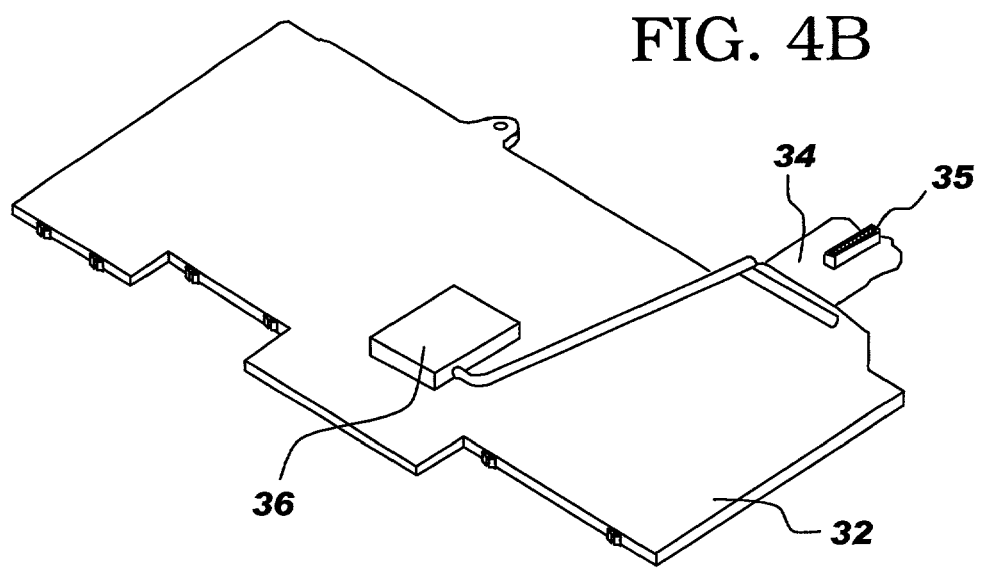

This configuration of the reinforcing member 11-1 enables the base plate of the keyboard unit and the raised portions 23 of the EMI contact finger 24 to contact each other when the keyboard unit is attached to the housing 1. FIGS. 4A and 4B shows an exemplar keyboard unit 31 used in a preferred embodiment of the present invention. This keyboard unit 31 has input keys 33 provided on an electrically conductive base plate 31, and allows for signal exchange with the system side through a connector 35 on a connection portion 34.

Figure 5:
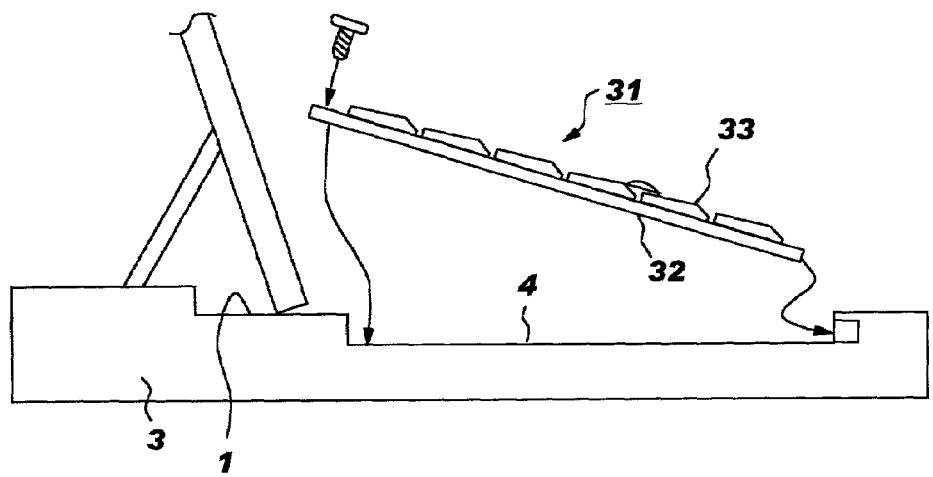
FIG. 5 illustrates an exemplar method for attaching the keyboard unit in the portable information terminal in a preferred embodiment of the present invention.

When the keyboard unit 31 is attachably fitted to the housing 1 as shown in FIG. 5, the raised portions 23 is pressed by the base plate 32 of the keyboard unit 31 to recede to the plane on which the openings 22 of the reinforcing member 11-1 are formed. In this state, the raised portions 23 are urged upward by the reaction of bending of the EMI contact finger 24, so that the raised portions 23 and the base plate 32 of the keyboard unit 31 are maintained in contact with each other with reliability. The raised portions 23 and the base plate 32 are kept in contact with each other over the entire surface of the base plate 32 of the keyboard unit 31. Therefore the base unit 32 can be maintained at ground level with reliability to provide an anti-EMI radiation means as well as to solve the problem of ESD or RF grounding connection.

More specifically, in the preferred embodiment of the present invention, a loud speaker, an audio card, audio jacks (headphone jack, microphone jack), etc., are provided below the keyboard unit 31, and these components are connected to a system main unit. If this connection structure is not shielded, there is a possibility of some portion of the connection structure functioning as an antenna for receiving electric waves to induce electric wave noise in the system when, for example, a portable telephone or the like is used near the notebook PC. There is also a possibility of electric waves generated in the system being emitted to the outside. However, the conductive base plate 32 of the keyboard unit 31 and conductive portions of the housing 1 are made to electrically contact each other to avoid such problems. For example, a pointing device controller 36 shown in FIG. 4B converts an operation of a pointing device 37 shown in FIG. 4A into an analog electrical value, amplifies it, and converts it into a digital value. Introduction of electric wave noise into components for processing an analog signal before amplification in such a process is a particularly important problem necessary to be avoided. The arrangement in the preferred embodiment of the present invention allows for solving this problem.

As is apparent from the foregoing, according to the present invention, reinforcing ribs and/or reinforcing members are formed radially from corners closer to a user in practical use to make the housing strong enough to resist even against a force applied through leverage when a user holds one or both of the corner portions between his or her fingers. Also, in the preferred embodiment, the base plate of the keyboard unit can be maintained at ground level with reliability.

What is claimed is:

1. A housing for a portable information terminal comprising:
   a body having a polygonal outer shape;
   a web portion extending across said body; and
   a plurality of reinforcing members arranged within a plurality of reinforcing member accommodation portions of said housing radially from a corner of said body closer to a front side of said body facing a user in practical use, wherein said plurality of reinforcing members reinforce said web portion of said housing in radial directions extending from said corner of said body at a plurality of acute angles from an edge of said body extending from said corner of said body, and
   an electromagnetic interference (EMI) contact finger inside at least one of said reinforcing members, wherein a keyboard unit is mounted on a portion of said housing on which said reinforcing members are arranged, wherein a base plate of the keyboard unit and said electromagnetic interference (EMI) contact finger are brought into contact with each other when the keyboard unit is attached to said housing, wherein at least one of said reinforcing members includes a generally U-shaped cross section including an opening facing said base plate of said keyboard, and wherein said electromagnetic interference (EMI) contact finger includes a lower portion extending within said U-shaped cross section and a raised portion extending upward through said opening to contact said base plate of said keyboard.

2. A housing for a portable information terminal comprising:
   a body having a polygonal outer shape;
   a web portion extending across said body; and
   a plurality of reinforcing ribs forming integral portions of said housing and a plurality of reinforcing members within a plurality of reinforcing member accommodation portions of said housing, said reinforcing ribs and reinforcing members being arranged radially from a corner of said body closer to a front side of said body facing a user in practical use, wherein said plurality of reinforcing ribs and said plurality of reinforcing members extend at a plurality of acute angles from an edge of said body extending from said corner of said body to reinforce said web portion of said housing in radial directions from said corner of said body, wherein a keyboard unit is mounted on a portion of said housing on which said reinforcing members are arranged,
   an electromagnetic interference (EMI) contact finger inside at least one of said reinforcing members, wherein a base plate of the keyboard unit and said electromagnetic interference (EMI) contact finger are brought into contact with each other when the keyboard unit is attached to said housing, wherein at least one of said reinforcing members includes a generally U-shaped cross section including an opening facing said base plate of said keyboard, and wherein said electromagnetic interference (EMI) contact finger includes a lower portion extending within said U-shaped cross section and a raised portion extending upward through said opening to contact said base plate of said keyboard.

3. A housing for a portable information terminal comprising:
   a body including a front side, facing a user in practical use and extending between a pair of front corners;
   a web portion extending across said body; and
   a plurality of reinforcing ribs forming integral portions of said housing arranged to extend radially from each of said front corners at a plurality of acute angles from said front side, wherein said plurality of reinforcing ribs reinforces said web portion of said housing in redial directions from each of said front corners at said plurality of acute angles from said front side,
   a plurality of reinforcing members arranged within a plurality of reinforcing member accommodation portions of said housing radially from each of said front corners, wherein a keyboard unit is mounted on a portion of said housing on which said reinforcing members are arranged, and
   an electromagnetic interference (EMI) contact finger inside at least one of said reinforcing members, wherein a base plate of the keyboard unit and said electromagnetic interference (EMI) contact finger are brought into contact with each other when the keyboard unit is attached to said housing, wherein at least one of said reinforcing members includes a generally U-shaped cross section including an opening facing said base plate of said keyboard, and wherein said electromagnetic interference (EMI) contact finger includes a lower portion extending within said U-shaped cross section and a raised portion extending upward through said opening to contact said base plate of said keyboard.

4. The housing according to claim 3, additionally comprising a position for attachment of a liquid crystal display (LCD) panel unit remote from said front corners.

* * * * *

UNITED STATES PATENT AND TRADEMARK OFFICE
CERTIFICATE OF CORRECTION

PATENT NO. : 7,635,081 B2 Page 1 of 1
APPLICATION NO. : 09/961722
DATED : December 22, 2009
INVENTOR(S) : Horiuchi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 976 days.

Signed and Sealed this

Ninth Day of November, 2010

David J. Kappos
*Director of the United States Patent and Trademark Office*